Feb. 3, 1959　　　　　J. W. DUGAN　　　　　2,872,297
APPARATUS FOR CONVERTING LIQUID ANHYDROUS
AMMONIA TO AQUA AMMONIA
Filed Jan. 11, 1955
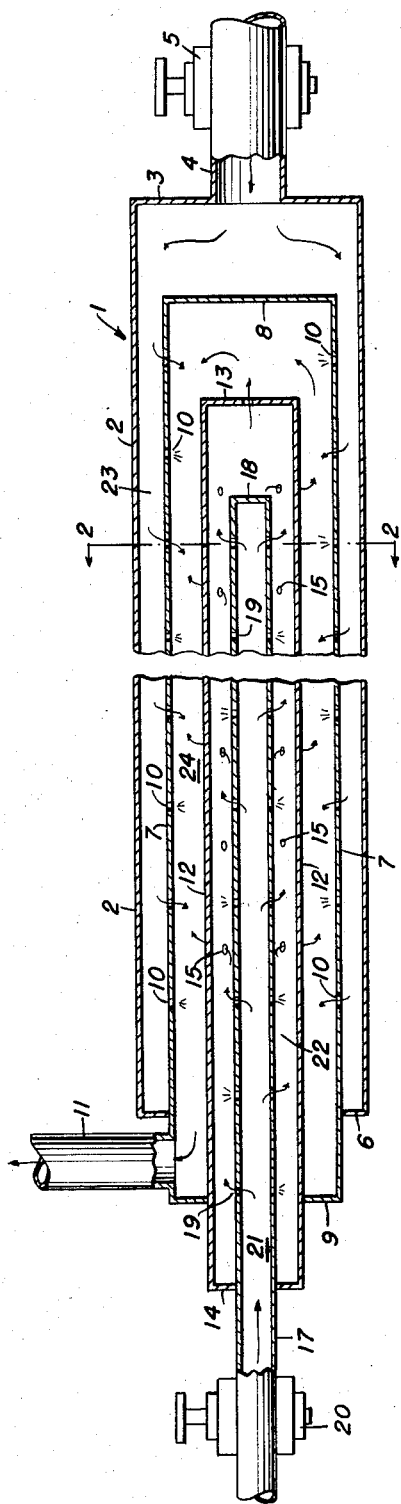
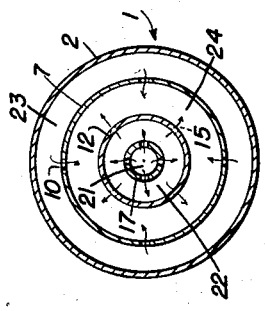
INVENTOR
*JOHN W. DUGAN*
BY *Baldwin + Wight*
*his* ATTORNEYS

United States Patent Office 2,872,297
Patented Feb. 3, 1959

2,872,297

APPARATUS FOR CONVERTING LIQUID ANHYDROUS AMMONIA TO AQUA AMMONIA

John W. Dugan, Houma, La., assignor to Flo-Mix Fertilizers Corporation, a corporation of Delaware Application January 11, 1955, Serial No. 481,205

9 Claims. (Cl. 23—285)

This invention relates to apparatus for converting liquid anhydrous ammonia to aqua ammonia.

Aqua ammonia is a solution of ammonia and water and is in wide use as a fertilizer. The production of aqua ammonia is hampered by the reaction between ammonia and water when the two are mixed. As is well known, ammonia may be absorbed in water to produce aqua ammonia, but the absorption of the ammonia generates heat which acts to raise the temperature of the water. The amount of ammonia which can be absorbed and retained in solution by the water, and hence the concentration of the solution, varies inversely with the temperature of the water. That is, the higher the temperature of the water, the lesser the amount of ammonia which can be retained in solution, and the weaker the concentration of the aqua ammonia.

To overcome the difficulties encountered in producing aqua ammonia, special equipment heretofore has been devised, but has not proven entirely satisfactory for the reasons that such equipment usually is expensive, large, and not suitable for economical transportation to locations such as farms where the demand for aqua ammonia is great.

Liquid anhydrous ammonia ordinarily is stored and transported in vessels or tanks under pressure ranging as high as two hundred pounds per square inch. A characteristic of liquid anhydrous ammonia on which this invention depends is that when the pressure of liquid anhydrous ammonia is reduced, the reduction in pressure is accompanied by a decrease in temperature. In accordance with the invention, it is proposed to cause the reduction in pressure of the liquid anhydrous ammonia to take place adjacent to the chamber where the mixing of the water and liquid anhydrous ammonia occurs, enabling the relatively low pressure liquid anhydrous ammonia, which is at a relatively low temperature, to be utilized prior to its absorption in the water to cool the mixing chamber so as to counteract or offset the increase in temperature which accompanies the absorption of the ammonia in the water. By cooling the mixing chamber, some of the heat generated in the mixing operation is absorbed by the chamber walls rather than by the water. As a result, the water does not become as warm as it would be if all of the generated heat were absorbed by the water, and the concentration of the aqua ammonia produced is greater than it would be if the water absorbed substantially all the heat generated.

An object of the invention is to provide apparatus for the conversion of liquid anhydrous ammonia to aqua ammonia and which is economical in construction, convenient to transport, and simple to operate.

Another object of the invention is to provide an apparatus for performing a method of converting liquid anhydrous ammonia under pressure to aqua ammonia which utilizes the tendency of ammonia to become cooled upon a reduction of its pressure to counteract the tendency of ammonia and water to become heated when mixed.

Other objects and advantages of the invention will be pointed out specifically or will become apparent from the following specification when considered in conjunction with the appended claims and the accompanying drawings in which:

Figure 1 is a fragmentary side view, partly in elevation and partly in section, of apparatus constructed in accordance with the invention; and Figure 2 is a sectional view taken on the line 2—2 of Figure 1.

The converter 1 disclosed in the drawing to illustrate the invention comprises a generally cylindrical or tubular vessel 2 provided at one end with a wall 3 to which is secured a pipe 4 having means (not shown) adapted for connection to a source of water supply. A valve 5 of suitable construction is provided in the water pipe 4 for controlling the admission of water into the tube 2. The other end of the tube 2 is open, except for a narrow flange 6. A cylindrical or tubular vessel 7 having a closed wall 8 at one end is positioned partially within the tube 2, the closed end wall 8 being spaced from the wall 3 of the tube 2. The wall 8 is closed to prevent water's being forced into the interior of the cylinder 7 when the valve 5 is opened. The other end of the cylinder 7 is open except for a narrow flange 9 similar to flange 6. The side walls of the cylinder 7 are provided with a plurality of longitudinally spaced, circumferentially disposed openings 10 which constitute communication means or ports for the passage of water for a purpose to be explained. The end of the cylinder 7 which projects beyond the end of the tube 2 is equipped with a discharge pipe 11 in communication with the interior of the cylinder 7.

A cylinder or vessel 12 formed of heat conductive material and having a ported end wall 13 is positioned partially within the cylinder 7, the end wall 13 of the cylinder 12 being spaced from the wall 8 of the cylinder 7, and the other end of the cylinder 12 projecting beyond the end of the cylinder 7. The projecting end of the cylinder 12 is open except for a narrow flange 14. In addition to the port in the end wall 13, the cylinder 12 is provided with a plurality of longitudinally spaced, circumferentially disposed ports 15 which provide means of communication between the interiors of cylinders 7 and 12.

A liquid anhydrous ammonia inlet vessel in the form of a tube or pipe 17 projects into cylinder 12, the closed end 18 of the pipe being spaced from the wall 13 of the cylinder 12. The pipe 17 is provided with a plurality of longitudinally and circumferentially spaced openings or ports 19 to provide communication between the interior of pipe 17 and the cylinder 12. The end of the pipe 17 which is outside of the cylinder 12 may be provided with means (not shown) for connecting the pipe to a source of supply of liquid anhydrous ammonia which conveniently may be a vessel or tank of a known type in which liquid anhydrous ammonia is stored under pressure. The pipe 17 preferably includes valve means 20 of suitable construction for regulating the flow of liquid anhydrous ammonia into the converter 1.

As illustrated in the drawing, the arrangement of the parts is such that each tube or cylinder is concentrically disposed with respect to the other tubes or cylinders. This arrangement makes it possible for the conversion process to be accomplished simply, economically and with the desired result. Another advantage of the concentric arrangement of the parts is that the flanges 6, 9 and 14 not only seal the respective ends of the cylinders of which they art a part, but also provide convenient means for holding the respective tubes or cylinders in properly spaced relation to the remaining tubes or cylinders. Additional spacing means (not shown) may be incorporated in the converter if necessary or desired and may comprise spiders or the like.

When using the apparatus for the conversion of liquid anhydrous ammonia to aqua ammonia, the water and liquid anhydrous ammonia supply pipes are connected to their respective sources of supply and valves 5 and 20 adjusted to admit the desired quantities of water and liquid anhydrous ammonia, respectively. Liquid anhydrous ammonia enters the interior of the pipe 17 or the chamber 21 of the converter and passes by restricted stream flow from the chamber 21 through the ports 19 into a pressure reducing chamber 22 defined by the walls of the pipe 17 and the walls of the cylinder 12. As the liquid anhydrous ammonia is admitted to the chamber 22, the pressure of the liquid anhydrous ammonia is reduced and the reduction in pressure is accompanied by a drop or reduction in temperature of the liquid anhydrous ammonia. The cooled liquid anhydrous ammonia thus comes into contact with the walls of the cylinder 12 and cools those walls, the importance of which will be explained.

Simultaneously with the introduction of liquid anhydrous ammonia into the chamber 21, water is admitted into the water chamber 23, this chamber being defined by the walls of the cylinder 2 and the walls of the cylinder 7. From the chamber 23 water passes through the ports 10 into the mixing chamber 24 which is defined by the walls of the cylinders 7 and 12. The walls of the cylinder 12 thus are common to the pressure reducing and mixing chambers 22 and 24, respectively. Simultaneously with the introduction of water into the mixing chamber 24, reduced pressure liquid anhydrous ammonia passes from the pressure reducing chamber 22 through the ports 15 into the mixing chamber 24 and is mixed with and absorbed by the water. The absorption of ammonia in the water is accompanied by generation of heat. Since the liquid anhydrous ammonia has been cooled by reduction of its pressure prior to its being mixed with the water, however, the walls of the cylinder 12 will have become cooled by the contact with the relatively low temperature liquid anhydrous ammonia so that some of the heat generated by the absorption of the ammonia in the water will be absorbed by the walls of the mixing chamber, and more particularly by the walls of the cylinder 12, which thus serves as a heat transfer element.

From the mixing chamber 24 aqua ammonia is discharged through the pipe 11 for use as desired.

An important feature of the apparatus is that it enables a substantial balance of thermal exchange to be achieved. For example, in a typical operation, liquid anhydrous ammonia from a supply tank was introduced into the converter through the tube 17 at one hundred pounds per square inch pressure and at a temperature of approximately 63° F. The anhydrous ammonia was delivered into the pressure reducing chamber 22 and the pressure and temperature dropped to thirty-two pounds per square inch and approximately 19° F., respectively. The water entered the water receiving chamber 23 under thirty-two pounds per square inch pressure and at a temperature of 58° F. The pressure in the mixing chamber was thirty-two pounds per square inch and the temperature of the aqua ammonia as it left the converter was approximately 95° F. The aqua ammonia produced in this operation was a thirty percent normal solution.

The control valves 5 and 20 may be varied to obtain different pressures and different concentrations of the solution, within reasonable limits.

The converter and method of operation described are representative of apparatus and procedures according to the invention, but the disclosure is intended to be illustrative rather than definitive of the invention. The invention is defined in the appended claims.

I claim:

1. Apparatus for converting liquid anhydrous ammonia to aqua ammonia comprising a first vessel providing a liquid anhydrous ammonia receiving chamber; a second vessel in concentric surrounding relation with said first vessel and providing a liquid anhydrous ammonia pressure reducing chamber; means communicating with said liquid anhydrous ammonia receiving chamber and said pressure reducing chamber for delivering liquid anhydrous ammonia from said liquid anhydrous ammonia receiving chamber into said pressure reducing chamber; a third vessel in concentric surrounding relation with said first and second vessels and providing a water and liquid anhydrous ammonia mixing chamber; means communicating with said pressure reducing chamber and said mixing chamber for delivering reduced pressure anhydrous ammonia from said pressure reducing chamber into said mixing chamber; a fourth vessel in concentric surrounding relation with said first, second, and third vessels and providing a water receiving chamber; and means communicating with said mixing chamber and said water receiving chamber for delivering water from said water receiving chamber into said mixing chamber, said mixing chamber being interposed between said pressure reducing chamber and said water receiving chamber.

2. Apparatus for converting liquid anhydrous ammonia to aqua ammonia comprising a first vessel providing a liquid anhydrous ammonia receiving chamber; valve means for controlling flow of liquid anhydrous ammonia into said liquid anhydrous ammonia receiving chamber; a second vessel in concentric surrounding relation with said first vessel and providing a liquid anhydrous ammonia pressure reducing chamber; means communicating with said liquid anhydrous ammonia receiving chamber and said pressure reducing chamber for delivering liquid anhydrous ammonia from said liquid anhydrous ammonia receiving chamber into said pressure reducing chamber; a third vessel in concentric surrounding relation with said first and second vessels and providing a water and liquid anhydrous ammonia mixing chamber; means communicating with said pressure reducing chamber and said mixing chamber for delivering reduced pressure anhydrous ammonia from said pressure reducing chamber into said mixing chamber; a fourth vessel in concentric surrounding relation with said first, second, and third vessels and providing a water receiving chamber; valve means for controlling flow of water into said water receiving chamber; and means communicating with said mixing chamber and said water receiving chamber for delivering water from said water receiving chamber into said mixing chamber, said mixing chamber being interposed between said pressure reducing chamber and said water receiving chamber.

3. Apparatus for converting liquid anhydrous ammonia to aqua ammonia comprising a first vessel providing a liquid anhydrous ammonia receiving chamber; valve means for controlling flow of liquid anhydrous ammonia into said liquid anhydrous ammonia receiving chamber; a second vessel in concentric surrounding relation with said first vessel and providing a liquid anhydrous ammonia pressure reducing chamber; means communicating with said liquid anhydrous ammonia receiving chamber and said pressure reducing chamber for delivering liquid anhydrous ammonia from said liquid anhydrous ammonia receiving chamber into said pressure reducing chamber; a third vessel in concentric surrounding relation with said first and second vessels and providing a water and liquid anhydrous ammonia mixing chamber; means communicating with said pressure reducing chamber and said mixing chamber for delivering reduced pressure anhydrous ammonia from said pressure reducing chamber into said mixing chamber; a fourth vessel in concentric surrounding relation with said first, second, and third vessels and providing a water receiving chamber; valve means for controlling flow of water into said water receiving chamber; and means communicating with said mixing chamber and said water receiving chamber for delivering water from said water receiving chamber into said mixing chamber, said liquid anhydrous ammonia receiving chamber being the innermost of said chambers, said pressure reducing chamber surrounding and being immediately adjacent to said liquid anhydrous ammonia receiving chamber, said mixing chamber surrounding and being immediately adjacent to said pressure reducing chamber, and said water receiving chamber surrounding and being immediately adjacent to said mixing chamber.

4. Apparatus for converting liquid anhydrous ammonia to aqua ammonia comprising a first vessel providing a liquid anhydrous ammonia receiving chamber; a second vessel in concentric surrounding relation with said first vessel and providing a liquid anhydrous ammonia pressure reducing chamber; a plurality of deployed passages in said first vessel communicating with said liquid anhydrous ammonia receiving chamber and said pressure reducing chamber for delivering liquid anhydrous ammonia from said liquid anhydrous ammonia receiving chamber into said pressure reducing chamber; a third vessel in concentric surrounding relation with said first and second vessels and providing a water and liquid anhydrous ammonia mixing chamber; a plurality of deployed passages in said second vessel communicating with said pressure reducing chamber and said mixing chamber for delivering reduced pressure anhydrous ammonia from said pressure reducing chamber into said mixing chamber; a fourth vessel in concentric surrounding relation with said first, second, and third vessels and providing a water receiving chamber; and a plurality of deployed passages in said third vessel communicating with said mixing chamber and said water receiving chamber for delivering water from said water receiving chamber into said mixing chamber, said mixing chamber being interposed between said pressure reducing chamber and said water receiving chamber.

5. Apparatus for converting liquid anhydrous ammonia to aqua ammonia comprising a first vessel providing a liquid anhydrous ammonia receiving chamber; a second vessel providing a liquid anhydrous ammonia pressure reducing chamber; means communicating with said liquid anhydrous ammonia receiving chamber and said pressure reducing chamber for delivering liquid anhydrous ammonia from said liquid anhydrous ammonia receiving chamber into said pressure reducing chamber; a third vessel providing a water and liquid anhydrous ammonia mixing chamber; means communicating with said pressure reducing chamber and said mixing chamber for delivering reduced pressure anhydrous ammonia from said pressure reducing chamber into said mixing chamber; a fourth vessel providing a water receiving chamber; and means communicating with said mixing chamber and said water receiving chamber for delivering water from said water receiving chamber into said mixing chamber, said second and third vessels having a heat conducting wall common to both said second and third vessels, said wall intervening between said pressure reducing chamber and said mixing chamber, whereby cooling of anhydrous ammonia due to reduction of pressure thereof in said pressure reducing chamber is effective, by transfer of heat through said common wall, for preventing undesirable temperature rise in said mixing chamber due to mixing of anhydrous ammonia and water therein.

6. Apparatus for converting liquid anhydrous ammonia to aqua ammonia comprising a first vessel providing a liquid anhydrous ammonia receiving chamber; a second vessel in concentric surrounding relation with said first vessel and providing a liquid anhydrous ammonia pressure reducing chamber; means communicating with said liquid anhydrous ammonia receiving chamber and said pressure reducing chamber for delivering liquid anhydrous ammonia from said liquid anhydrous ammonia receiving chamber into said pressure reducing chamber; a third vessel in concentric surrounding relation with said first and second vessels and providing a water and liquid anhydrous ammonia mixing chamber; means communicating with said pressure reducing chamber and said mixing chamber for delivering reduced pressure anhydrous ammonia from said pressure reducing chamber into said mixing chamber; a fourth vessel in concentric surrounding relation with said first, second, and third vessels and providing a water receiving chamber; and means communicating with said mixing chamber and said water receiving chamber for delivering water from said water receiving chamber into said mixing chamber, said second and third vessels having a heat conducting wall common to both said second and third vessels, said wall intervening between said pressure reducing chamber and said mixing chamber, whereby cooling of anhydrous ammonia due to reduction of pressure thereof in said pressure reducing chamber is effective, by transfer of heat through said common wall, for preventing undesirable temperature rise in said mixing chamber due to mixing of anhydrous ammonia and water therein.

7. Apparatus for converting liquid anhydrous ammonia to aqua ammonia comprising a first vessel providing an anhydrous ammonia pressure reducing chamber; means for admitting liquid anhydrous ammonia under pressure to said pressure reducing chamber; a second vessel providing an anhydrous ammonia and water mixing chamber, said vessels being immediately adjacent to each other and having a common heat conducting wall between said pressure reducing chamber and said mixing chamber whereby cooling of anhydrous ammonia due to reduction of pressure thereof in said pressure reducing chamber is effective, by transfer of heat through said common wall, for preventing undesirable temperature rise in said mixing chamber due to mixing of anhydrous ammonia and water therein, said common wall having ports for enabling flow of anhydrous ammonia from said pressure reducing chamber to said mixing chamber; and means for delivering water into said mixing chamber.

8. Apparatus for converting liquid anhydrous ammonia to aqua ammonia comprising a first vessel providing an anhydrous ammonia pressure reducing chamber; means for admitting liquid anhydrous ammonia under pressure to said pressure reducing chamber; a second vessel concentric with said first vessel and providing an anhydrous ammonia and water mixing chamber, said vessels being immediately adjacent to each other and having a common heat conducting wall between said pressure reducing chamber and said mixing chamber whereby cooling of anhydrous ammonia due to reduction of pressure thereof in said pressure reducing chamber is effective, by transfer of heat through said common wall, for preventing undesirable temperature rise in said mixing chamber due to mixing of anhydrous ammonia and water therein, said common wall having ports for enabling flow of anhydrous ammonia from said pressure reducing chamber to said mixing chamber; and means for delivering water into said mixing chamber.

9. Apparatus for converting liquid anhydrous ammonia to aqua ammonia comprising a first vessel providing an anhydrous ammonia pressure reducing chamber; means for admitting liquid anhydrous ammonia under pressure to said pressure reducing chamber; a second vessel providing an anhydrous ammonia and water mixing chamber, said second vessel concentrically exteriorly surrounding said first vessel and said vessels being immediately adjacent to each other and having a common heat conducting wall between said pressure reducing chamber and said mixing chamber whereby cooling of anhydrous ammonia due to reduction of pressure thereof in said pressure reducing chamber is effective, by transfer of heat through said common wall, for preventing undesirable temperature rise in said mixing chamber due to mixing of anhydrous ammonia and water therein, said common wall having ports for enabling flow of anhydrous ammonia from said pressure reducing chamber to said mixing chamber; and means for delivering water into said mixing chamber.

References Cited in the file of this patent

UNITED STATES PATENTS

| | | |
|---|---|---|
| 845,189 | Osborne | Feb. 26, 1907 |
| 1,885,012 | Harvey | Oct. 25, 1932 |
| 2,630,376 | Dunn | Mar. 3, 1953 |
| 2,701,182 | Sellers et al. | Feb. 1, 1955 |